Oct. 11, 1966  M. J. G. BIDET  3,277,647
PARKING INDICATOR
Filed April 8, 1964  4 Sheets-Sheet 1

Oct. 11, 1966   M. J. G. BIDET   3,277,647
PARKING INDICATOR
Filed April 8, 1964

Oct. 11, 1966　　　　M. J. G. BIDET　　　3,277,647
PARKING INDICATOR

Filed April 8, 1964　　　　　　　　　　　　　　4 Sheets-Sheet 3

United States Patent Office 3,277,647
Patented Oct. 11, 1966

3,277,647
PARKING INDICATOR
Maurice Julien Gustave Bidet, 160 Rue St. Charles,
Paris, France
Filed Apr. 8, 1964, Ser. No. 358,279
Claims priority, application France, Apr. 11, 1963,
931,322, Patent 1,355,941
1 Claim. (Cl. 58—143)

A first object of the invention is a parking indicator or device to give a reminder by a signal that the prescribed parking time of a vehicle at a given spot has been exceeded.

Another object of the invention is to prevent any fraud that would allow the time to be altered when the signalling appliance comes into action.

Other objects and advantages will be revealed by the description hereafter, claims and attached drawings, in which:

Figure 1:
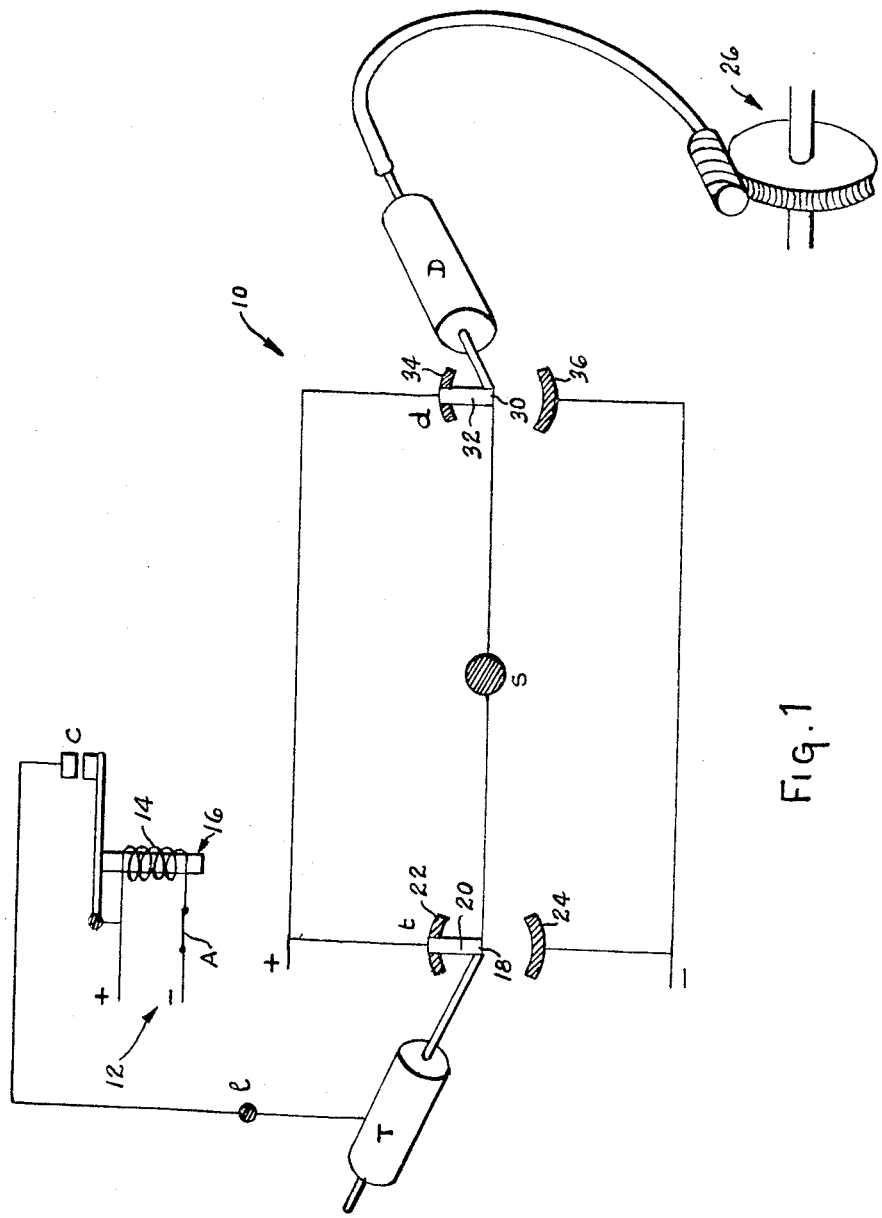
FIGURE 1 is a diagrammatical view of a parking indicator during the displacement of the vehicle.
Figure 2:
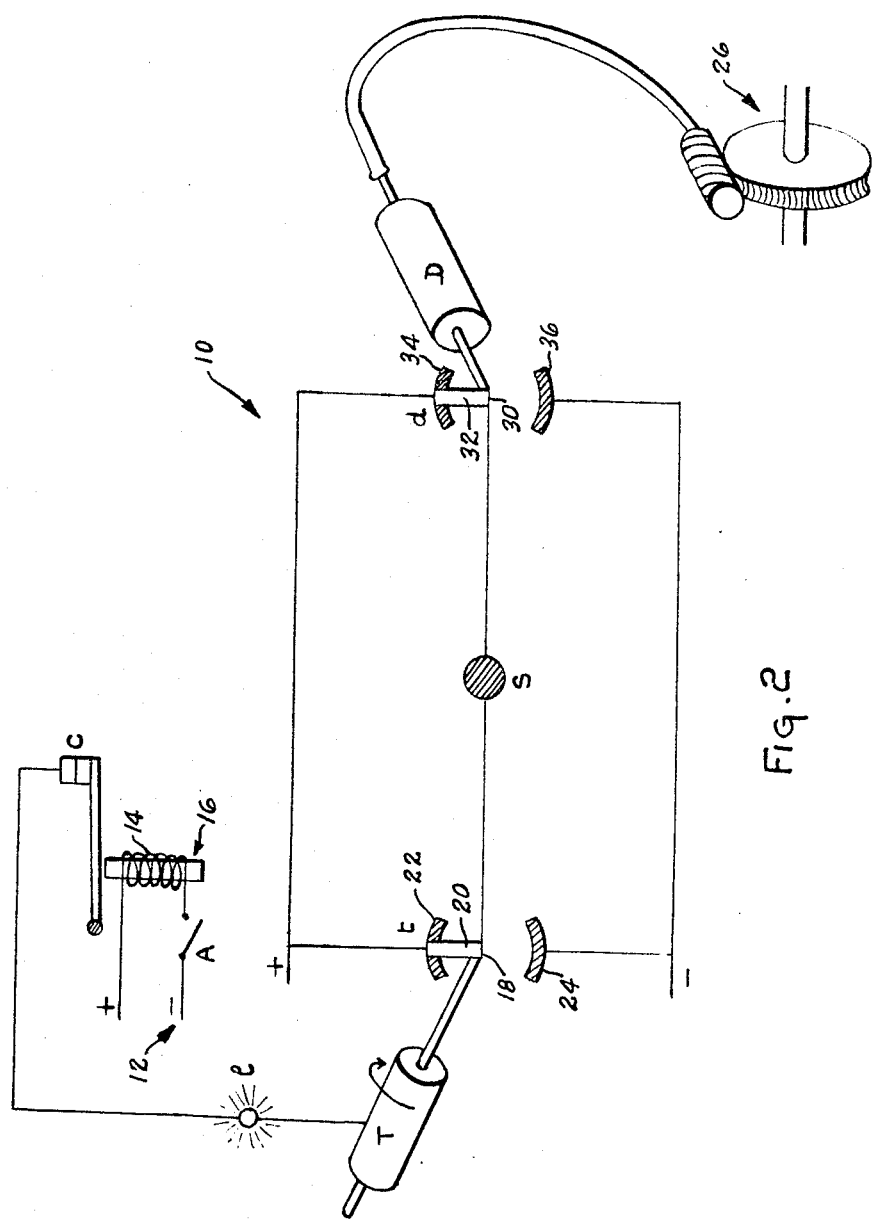
FIGURE 2 is a diagrammatical view showing the starting up of the time meter after the vehicle has stopped.

As best seen in FIGURE 1, a parking indicator 10, in accordance with the instant invention comprises a time meter T that is calibrated in accordance with local vehicle regulations. The meter T is connected to a source of electrical energy 12 and, as seen in FIGURE 2, starts up automatically, upon closing of a pair of the contacts C due to deenergization of a coil 14 of a relay 16. The coil 14 is deenergized when a driver stops the engine of his vehicle due to opening an ignition switch A.

Figure 3:
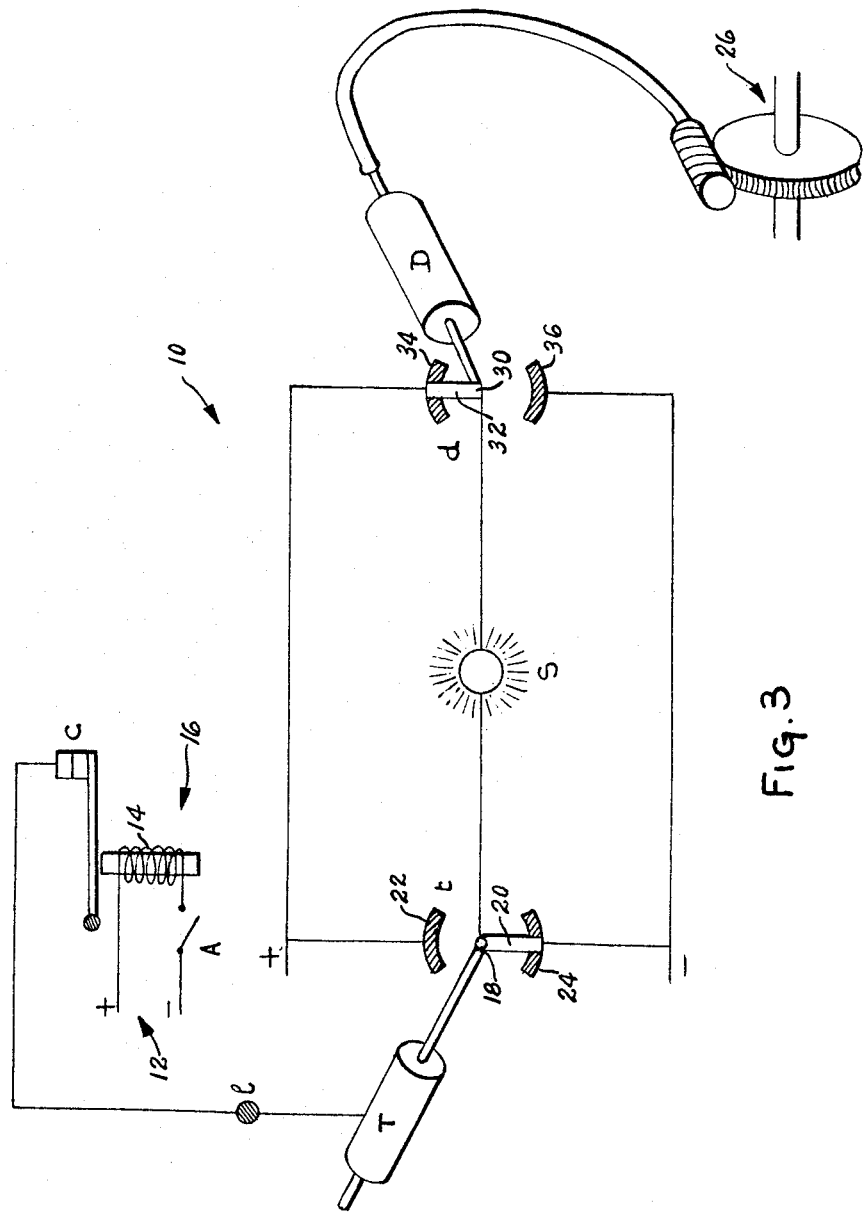
FIGURE 3 is a diagrammatical view of the parking indicator showing the working of the signalling means.

As best seen in FIGURE 3, at the end of a predetermined time after energization, the time meter operates a switch $t$ so as to energize the lamp S. The switch $t$ has a center tap 18, movable contact arm 20 and a pair of fixed contacts 22 and 24. Switching is accomplished by rotating the contact arm 20 into engagement with the fixed contact 24, as illustrated in FIGURE 3.

A distance meter D is connected to a gear box 26, for example the mileage recorder of the vehicle. The distance meter D is connected to a switch $d$ having a center tap 30, movable contact arm 32 and a pair of fixed contacts 34 and 36. Rotation of the distance meter D due to a predetermined travel of the vehicle is effective to rotate the contact arm 32 from the contact 34 to the contact 36.

FIGURES 1, 2, 3 and 4 show the various working phases of the appliance.

FIGURE 1 gives the position of the various components of the device when the vehicle is running normally. The ignition switch A is closed and the switch C open, the time meter T is not working, the lamp 1 is extinguished. Owing to the position of the switches $t$ and $d$, the Signal S is switched off.

FIGURE 2 shows the position of the same components when the vehicle stops. By switching off the ignition A, the switch C is closed and the time meter T starts up, at the same time that it lights the telltale lamp 1.

FIGURE 3 shows the circuits at the end of the regulation time. The time meter T controls the displacement of the switch $t$ for half a revolution and extinguishes the lamp 1. Owing to the relative position of $t$ and $d$, the signal S comes into action. It will remain so, as long as the vehicle has not covered a distance of $n$ miles prescribed by the regulations.

Figure 4:
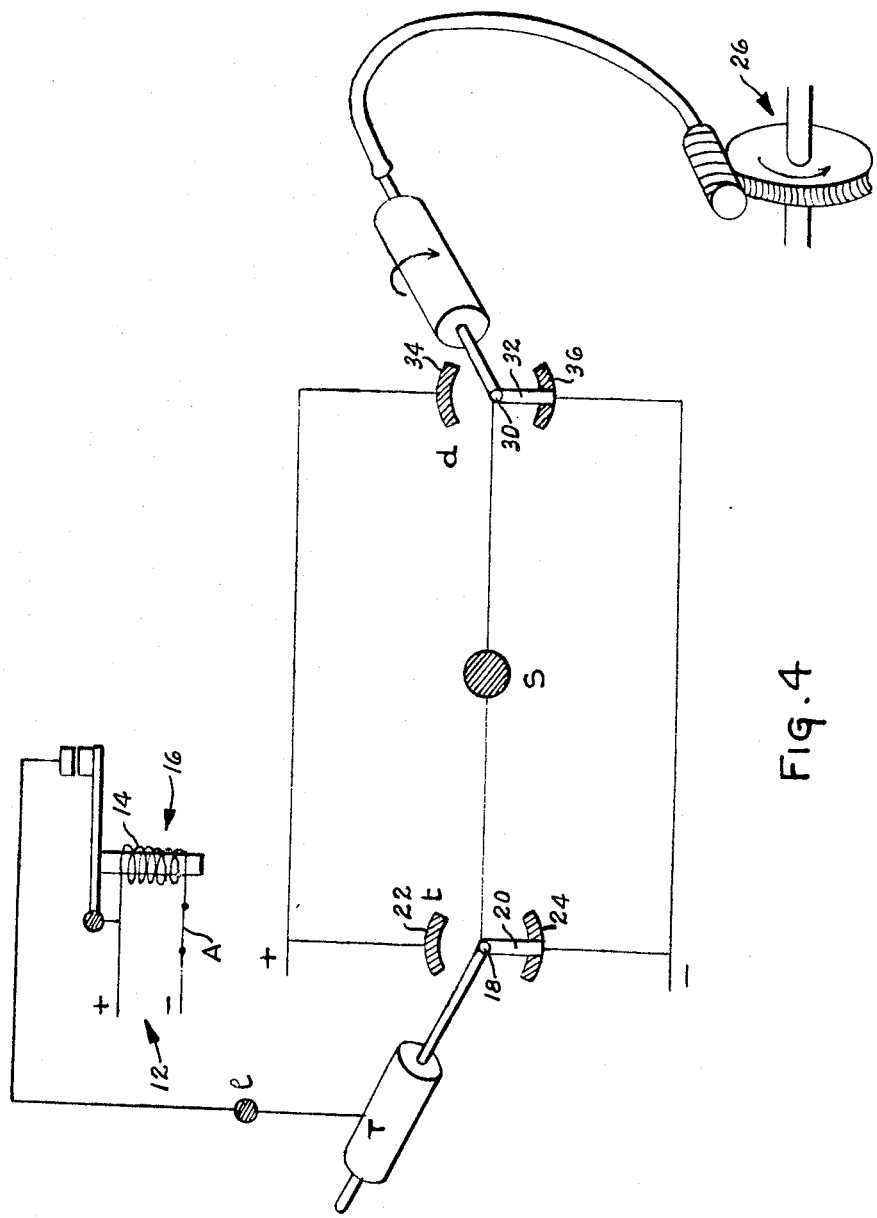
FIGURE 4 is a view showing the action of the distance meter stopping the working of the signalling means when the vehicle has covered a minimum predetermined distance.

FIGURE 4 corresponds to the moment when the vehicle has covered $n$ miles; at this moment, the mileage recorder D moves the switch $d$ for a half-turn, which opens the circuit on which the signal S is branched and stops it working; at the same time, the device is conditioned to repeat the aforesaid cycle; the switches $t$ and $d$ being in relative position identical to those of FIGURE 1.

The signal S can be replaced, if regulations permit, by a time recorder, without the invention being affected by it.

What I claim is:

A parking indicator for motor vehicles comprising, a source of electrical energy, an electrical time meter, a relay having a pair of separable contacts electrically connected to opposite sides of said source of electrical energy, respectively, and to said time meter for controlling energization thereof, a vehicle ignition switch electrically connected to opposite sides of said source of electrical energy and to said relay for effecting control thereof, opening of said switch effecting closure of said relay contacts and energization of said time meter, a first signal light connected between said relay contacts and said time meter for indicating energization of said time meter, a time meter switch controlled by said time meter and having a center tap and first and second contacts electrically connected to opposite sides of said source of electrical energy, respectively, a distance meter mechanically connected to the drive train of the motor vehicle so as to be responsive to movement thereof, a distance meter switch controlled by said distance meter having a center tap and first and second contacts electrically connected to opposite sides of said source of electrical energy, respectively, and a second signal light electrically connected between the center taps of said time meter switch and said distance meter switch, said second signal light being initially connected to one side of said source of electrical energy through the center taps and first contacts of said time meter switch and said distance meter switch, respectively, deenergization of said ignition switch effecting energization of said time meter thereby to effect opening of the first contact of said time meter switch after a pre-determined period of time and closure of the second contact thereof to effect connection of one side of said second signal light to the other side of said source of electrical energy and energization thereof, movement of the vehicle a pre-determined distance effecting rotation of said distance meter thereby to effect opening of the first contact and closure of the second contact of said distance meter switch thereby to connect said second signal light to the other side of said source of electrical energy whereby said second signal light is deenergized and said parking indicator is conditioned for indicating a second parking period.

References Cited by the Examiner

UNITED STATES PATENTS

| 1,414,910 | 5/1922 | Watson | 58—143 |
| 2,289,362 | 7/1942 | Hickey | 58—143 |

FOREIGN PATENTS

| 688,365 | 5/1930 | France. |

RICHARD B. WILKINSON, *Primary Examiner.*

LEO SMILOW, *Examiner.*

G. F. BAKER, *Assistant Examiner.*